United States Patent
Schmittinger et al.

(10) Patent No.: US 10,479,026 B2
(45) Date of Patent: Nov. 19, 2019

(54) METHOD AND DEVICE FOR CONNECTING PROFILE PARTS

(71) Applicant: Rotox Besitz- und Verwaltungsgesellschaft MbH, Brechen (DE)

(72) Inventors: Guido Schmittinger, Hahn (DE); Bernd Eisenbach, Brechen (DE); Winfried Daun, Grenderich (DE); Christian Denk, Schönau (DE)

(73) Assignee: Rotox Besitz-und Verwaltungsgesellschaft mbH, Brechen (DE)

( * ) Notice: Subject to any disclaimer, the term of this patent is extended or adjusted under 35 U.S.C. 154(b) by 81 days.

(21) Appl. No.: 15/569,861

(22) PCT Filed: May 3, 2016

(86) PCT No.: PCT/EP2016/059870
§ 371 (c)(1),
(2) Date: Oct. 27, 2017

(87) PCT Pub. No.: WO2016/177715
PCT Pub. Date: Nov. 10, 2016

(65) Prior Publication Data
US 2018/0111330 A1    Apr. 26, 2018

(30) Foreign Application Priority Data
May 7, 2015    (DE) .................. 10 2015 107 121

(51) Int. Cl.
*B29C 65/00*    (2006.01)
*B29C 65/20*    (2006.01)
(Continued)

(52) U.S. Cl.
CPC ............ *B29C 66/324* (2013.01); *B29C 65/20* (2013.01); *B29C 65/782* (2013.01);
(Continued)

(58) Field of Classification Search
CPC ... B29C 65/20; B29C 65/782; B29C 65/7835; B29C 66/324; B29C 66/3242;
(Continued)

(56) References Cited

FOREIGN PATENT DOCUMENTS

| DE | 2201656 A1 | 7/1973 |
|---|---|---|
| DE | 19644183 A1 | 4/1998 |

(Continued)

OTHER PUBLICATIONS

Machine translation of JP 2013151816 date unknown.*

*Primary Examiner* — John L Goff, II
(74) *Attorney, Agent, or Firm* — Rogowski Law LLC

(57) ABSTRACT

A method for connecting plastic profile parts (2) brings into contact at least one profile part (2) and a heating surface (34) of a heating, element (36) so that the profile part (2) begins to melt in its welding area before it is joined together with the other profile part (2). A delimiting element (7) regulates the flow and deformation of the melt material. The delimiting element (7) has at least one contact element (21) and a molded part (22), which are movable both in relation to one another and in relation to the profile part (2). During the melting of the at least one profile part (2), the contact element (21) is moved—together with the molded part (22)—relative to the at least one profile part (2) and relative to the heating element (36) out of, a resting position in the direction of a working position, whereby at least the molded part (22) is kept in contact with the heating surface (34) and the contact element element (21) is, kept in contact with a profile surface (9). When a changeover is made from melting to compressing, the relatively movable contact element (21)

(Continued)

is moved together with the molded part (22) in the direction of its working position so that the delimiting element (7) projects beyond a free front edge (4) of the at least one profile part (2) and creates a holding plane (37).

14 Claims, 4 Drawing Sheets

(51) Int. Cl.
| | |
|---|---|
| *E06B 3/96* | (2006.01) |
| *B29C 65/78* | (2006.01) |
| *B29L 31/00* | (2006.01) |
| *B29K 627/06* | (2006.01) |

(52) U.S. Cl.
CPC ...... *B29C 65/7835* (2013.01); *B29C 66/1162* (2013.01); *B29C 66/12221* (2013.01); *B29C 66/14* (2013.01); *B29C 66/5243* (2013.01); *B29C 66/52431* (2013.01); *B29C 66/71* (2013.01); *B29C 66/72523* (2013.01); *B29C 66/73921* (2013.01); *B29C 66/836* (2013.01); *E06B 3/9608* (2013.01); *B29K 2627/06* (2013.01); *B29L 2031/003* (2013.01); *B29L 2031/005* (2013.01)

(58) Field of Classification Search
CPC ............ B29C 66/1142; B29C 66/1162; B29C 66/5243; B29C 66/52431; B29C 66/14; B29C 66/72523; B29L 2031/003; B29L 2031/005; E06B 3/9608
USPC ............ 156/499, 304.2, 304.5, 304.6, 309.9
See application file for complete search history.

(56) References Cited

FOREIGN PATENT DOCUMENTS

| | | | |
|---|---|---|---|
| DE | 10102058 A1 | 7/2002 | |
| DE | 202015000908 U1 | 3/2015 | |
| JP | 2001301040 A | 10/2001 | |
| JP | 2013151816 A | * 8/2013 | ............ B29C 65/20 |

* cited by examiner

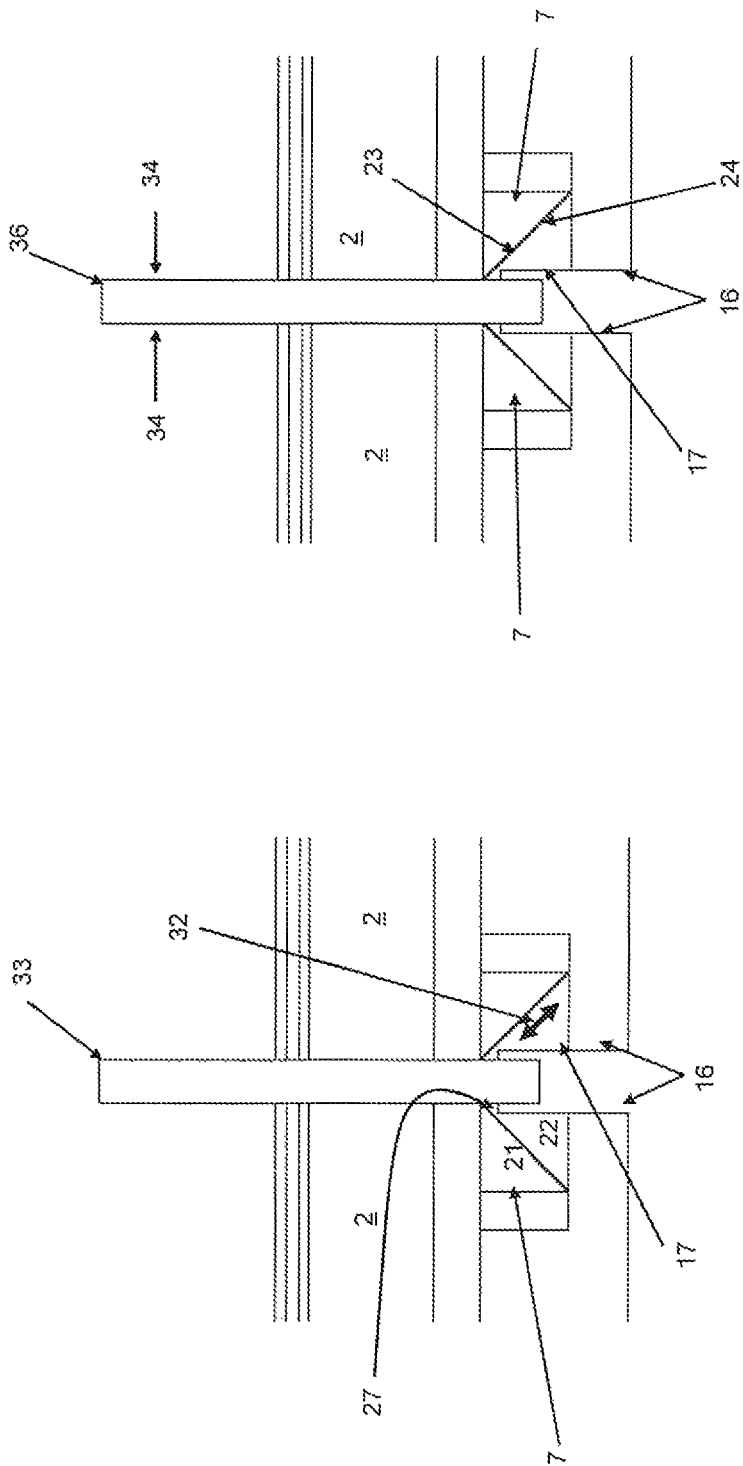

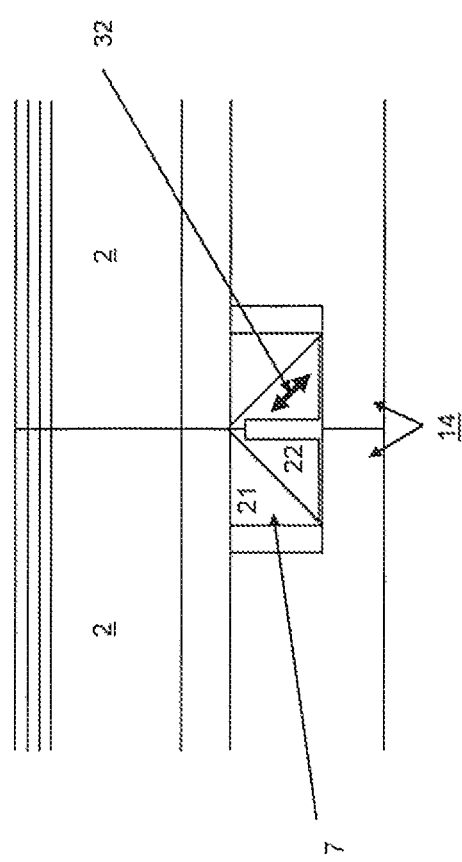

METHOD AND DEVICE FOR CONNECTING PROFILE PARTS

CROSS-REFERENCE TO RELATED APPLICATIONS

This application is a national stage application (under 35 USC § 371) of PCT/EP2016/059870, filed May 3, 2016, which claims benefit of German application No. 10 2015 107 121.5, filed May 7, 2015, the contents of each of which are incorporated by reference, herein.

BACKGROUND OF THE INVENTION

Technical Field and State of the Art

The invention relates to a method for connecting plastic profile parts, whereby at least one profile part, which is held on an associated profile support, and a heating surface of a heating element are brought into contact with each other in a joining direction in order to at least start to melt the at least one profile part in its welding area before it is joined to the other profile part, whereby a delimiting element is provided which rests against the profile part and which regulates the flow and deformation of the profile part that has at least started to melt. The invention also relates to a device being configured to carry out the method.

Methods and devices of the above-mentioned type are employed especially to weld PVC profile bars in order to form window frames or door frames. For this purpose, the profile bars are cut to the requisite length prior to the welding process and, if necessary, mitered in order to subsequently connect the profile parts at the cut surfaces, in other words, at the mitered surfaces, by means of welding.

The actual welding of the profile parts is carried out by starting to melt and subsequently joining the connection surfaces at the ends of the profile bars. For this purpose, the profile parts that are to be welded are first placed into an appropriate device and then positioned with the assistance of stops and guides. Then the connection surfaces are pressed against the heating surface of the heating element in a joining direction for purposes of the so-called placement and heating process in which material on the connection surface, in other words, in the welding area, is melted. The heating process is followed by the changeover and, joining steps, whereby the heating element between the profile parts is removed. Subsequently, the profile parts, together with the connection surfaces that have started to melt, in other words, together with the welding area that has started to melt, are moved towards each other in the joining direction, that is to say, they are pressed against each other, whereby the still hot thermoplastic material of the two ends of the profile bars is connected in such a way that a sturdy welded connection is created. Such an approach is cited by way of example in the introduction of German patent application DE 10 2012 112 533 A1.

German patent application DE 10 2012 112 533 A1 also cites parallel feed and diagonal-feed methods. In the case of the parallel-feed method, during the melting process, the mitered or connection surfaces whose melting is to be started move uniformly from both sides towards the heating surfaces of the heating element, which is positioned so as to be stationary in the middle, whereby the profile parts can be moved, for example, counter and perpendicular to the mitered surfaces or perpendicular to the longitudinal axis of the profile part. In the case of the diagonal-feed method, in contrast, one of the profile parts is positioned so as to be stationary while the other profile part as well as the heating element are moved in the longitudinal direction of the stationary profile part.

The two, pieces to be joined are themselves longer by the so-called burn-off than the final dimensions of the finished connected elements. Part of this burn-off is melted off by the heating element while another part is joined (compressed) in a subsequent step. This relationship of melting off and compression of the burn-off is variable. The burn-off itself can also differ.

During the actual melting-off process, the PVC starts to flow and it deforms, a process in which the melt moves inwards into the profile chambers as well as outwards onto the exposed surfaces of the PVC profile. In order to regulate this flow and deformation towards the outside, in other words, onto the exposed surfaces, the profile is constricted (delimited) with delimiting elements such as, for example, limitation knives. However, it is known that, during the welding process, this delimiting element itself is rigidly connected to the profile supports. Although the delimiting elements themselves can be adjusted so as to be tight, they do not come into contact with the profile stop and the heating element, so that, a defined gap always remains into which the melt can flow. This melt, which has been, pressed outwards, solidifies during the subsequent joining process, so that a weld bead is, formed. After a certain cooling-off time, this weld bead has to be removed in downstream machines (finishing machines). This can be done in various ways, such as, for example, by cutting grooves or creating a flush cut-off.

The removal of the weld bead, however, whether it is done manually or by machine, is very costly and time-consuming.

German utility model DE 20 2015 000 908 U1 discloses a device for welding two plastic profiles consisting of two clamping units that can be moved relative to each other in the pressing direction for purposes of the welding process. Each of the clamping units accommodates a plastic profile between a lower and an upper delimiting plate having a mitered pressing edge. The device also comprises a welding mirror. The pressing edge is configured on a separate strip situated in a stepped recess of each delimiting plate, whereby the strip is mounted in the recess of the delimiting plate so as to be movable perpendicular in the direction of the pressing edge. When the strip is in its basic position, the pressing edge extends beyond the front edge of the delimiting plate and, when the welding process is initiated, said pressing edge is configured such, that it can be moved in the pressing direction counter to a force. Consequently, the delimiting plate is made up of a rigid partial element and of a partial element that can be moved only in the plane of the rigid partial element, whereby the movable partial element is mounted on pins so as to be forced in the direction of the rigid partial element counter to a spring force when the melted ends of, the profile part are pressed against each other. In this manner, it is possible to achieve a gap-free state between the pressing edges of the strips during the welding. However, the strips extend beyond the mitered edge of the delimiting plates only by a fixed dimension that has to be individually specified, whereby this dimension that has to be individually specified has to coincide with the prescribed press stroke during the welding process. Consequently, for each press stroke, a delimiting plate that has to be made individually also has to be manufactured. Therefore, this inevitably calls for tremendous resources, also in terms of the storage of the delimiting plates that have to be kept in stock in order to do justice to the welding task in question.

Moreover, the considerable costs incurred for the production of the individually manufactured delimiting plates are anything but negligible.

U.S. Pat. No. 6,273,988 B1 discloses a method and a device for connecting plastic profiles, whereby each profile part is held in upper and lower dies. The upper and lower dies are each associated with a plate that is mounted so as to be movable relative to the appertaining upper and lower dies. The plate that is movable relative to the appertaining die can be moved in the direction of an opposite plate situated in the same plane so that its edges rest against a heating surface of a welding mirror. Once the welding mirror has been removed, the edges of the opposite plates are brought into contact during the welding process so that the formation of a weld bead should be avoidable since the plates virtually seal off the welding area.

In order to prevent the formation of a weld bead that protrudes from the exposed surfaces, international patent application WO 2013/132406 A1 proposes that the connection surfaces of the profile parts be profiled prior to the welding process. Thus, it is suggested that the front edges of the profile parts be mechanically milled so that the connection surfaces that are opposite from each other are imparted with, for example, a stepped configuration. During the connection, a chamber that is open towards the outside and that has relatively large dimensions is created. In this manner, after the profile parts have been connected, a groove can be created on the exposed surfaces without this necessitating any mechanical secondary finishing. In order to prevent an outward-protruding weld bead from nevertheless being formed, a pressure means is, likewise provided. The pressure means can be moved transversally, in other words, crosswise to the longitudinal direction of the profile parts as well as crosswise to the joining direction of the profile parts that are to be oriented towards each other, in addition to which the pressure means can also be heated. During the welding and joining processes, in other words, during the compression, a weld bead is nevertheless formed whose volume, however, is limited and smoothed due to the presence of the pressure means. Consequently, the pressure means determines the degree of filling of the chamber. In other words, the material of the weld bead that is being formed is kept in the chamber by the pressure means and the weld bead inside the chamber is smoothed to a previously prescribed level. This level can be situated below the external exposed surface of the profile parts in such a way that the above-mentioned groove is formed.

However, the smoothed weld bead volume can also be at the same level as the external exposed surfaces. It can be seen that, in international patent application WO 2013/132406 A1, when the chamber is being created, the quantity of material that is removed has to be, so large that the material of the weld bead that is being formed can be adequately distributed within the volume of the chamber. In the case of machining, however, shavings are formed that then have to be removed from the welding area using complex equipment. Even though the individual steps—including machining of the front edges as well as pressing and distributing the weld bead material inside the chamber—can be carried out by the appertaining welding machine, these special measures do not translate into any time and/or cost-related advantages. After all, instead of the secondary finishing work needed to remove the weld bead, prior to the welding process, the profile parts are processed in the welding machine itself, which is both time-consuming and costly. Another disadvantageous aspect is the considerable amount of material that has to be removed in order to create the chamber. After all, the volume of the chamber has to be able to accommodate at least the volume of the material of the weld bead. Therefore, in comparison to the material that has to be removed to create the chamber, no reduction is achieved when it comes to the quantity of material that needs to be taken out because of the weld bead that originally had to be removed.

In a device to weld plastic profiles whose cut surfaces that are to be welded adjoin each other with a positive fit as disclosed in German patent application DE 101 02 058 A1, it is proposed to provide at least two molded parts made of metal that cover the profiles to be welded in the area of the weld seam and that are configured with a positive fit relative to the surface of the profile in the area of the weld seam, whereby the profiles can be moved relative to the molded parts while retaining the positive fit with the molded parts.

German patent application DE 196 44 183 A1 discloses a device and method for connecting profile parts.

However, also in the devices and methods of the last two publications cited, it is necessary to perform secondary finishing work of the welding area.

Before this backdrop, one objective of the invention is to put forward an improved method and an improved device for connecting plastic profile parts, whereby the escape of the melt can also be better controlled and the shaping of the welding area during the connection process itself can be influenced so that secondary finishing work can be dispensed with completely or at least partially.

SUMMARY OF THE INVENTION

A method according to the invention provides that the delimit ng element comprises at least one contact element and a molded part, both of which can be moved towards each other as, well as towards the profile part, whereby, during the melting off of the at least one profile part, the contact element together with the molded part—is moved relative to the at least one profile part and relative to the heating element out of a resting position in the direction of a working position, whereby, at least during the melting-off process, at least the molded part is kept in contact with the heating surface of the heating element and, the contact element is kept in contact with a profile surface.

The term "melting-off process" as set forth in this application refers to the period of time from the beginning of the melting, over the course of the partial melting and the melting off, all the way to the end of the melting. The plastic profile parts are preferably PVC elements that are joined together to form window frames or door frames.

The heating element is removed once the melting-off process has been completed. In order to prevent the melt material from flowing in the direction of the external exposed surface of the at least one profile part, it is provided that, when a changeover is made from melting to compression, the relatively movable delimiting element—i.e. the contact element together with the molded part—is moved horizontally in the direction of its working position in such a way that the relatively movable delimiting element—i.e. the contact element together with the molded part—extends beyond a free front edge of the at least one profile part, so that a holding plane for the melt material is created. Since the relatively movable delimiting element—i.e. the contact element with its surface—rests against the profile surface, the appertaining surface of the melt material is advantageously held at the same level as the profile surface.

A method according to the invention prevents the melt from escaping to the outside, in other words, onto the external exposed surfaces of the profile parts, as a result of which rigid delimiting elements can be dispensed with. Advantageously, the welding bench, the clamping plates, in other words, the profile supports and/or the outer and inner dies, that is to say, virtually all of the elements that are in direct contact with the at least one profile part, can execute a movement relative to the joining pieces as a function of the intrinsic movement of the welding bench, in other words, of the profile support. In this manner, it is achieved that the relatively movable delimiting elements—i.e. the contact element together with molded part—are always in direct contact with the profile stop and with the heating surface of the heating element, also during the set-up, that is to say, during the positioning of the joining pieces on, a profile stop as well as during the melting-off process, in other words, when the melt material is being produced and during the post-heating using the heating element. The relative movement between the joining pieces and the relatively movable contact element, together with the molded part, is also effectuated during the melting-off process in that the joining pieces are moved towards each other by means of the welding bench, that is to say, by means of the profile supports, whereby the relatively movable contact elements, together with the molded part, compensate for this melting off, in other words, they can be moved not only in the joining direction but also counter to the joining direction, that is to say, they can be moved back in order to equalize the melt path.

For this reason, it is advantageously provided for the delimiting element—i.e. the contact element together with the molded part—to be moved in a horizontal direction, in other words, parallel to the surface of the at least one profile part.

In order to prevent the melt material from flowing into a gap between the profile surface and the corresponding surface of the relatively movable delimiting element—i.e. the contact element together with the molded part—the surface of the movable contact element preferably rests against the profile surface without leaving any gap.

The set-up can be carried out prior to the actual welding—that is to say, the connection process—whereby the at least one profile part is brought into contact with the profile stop, Advantageously, it is provided that the relatively movable delimiting element—i.e. the contact element together with the molded part—is moved horizontally into its working position during the set-up and thus brought into contact with the profile stop. Consequently, not only is the profile part aligned, but also, at the same time, the relevant position of the relatively movable delimiting element—i.e. the contact element together with the molded part—is specified.

After the set-up, the profile stop is removed, whereby the heating element then comes into use. In this context, the at least one profile part is brought into contact with the heating surface of the heating element. The set-up also advantageously aligns the delimiting element—i.e. the contact element together with the molded part—so that it rests against the mitered cut. In a practical manner it is provided here that the relatively movable delimiting element—i.e. the contact element together with the molded part—is likewise moved horizontally so that it can be brought into contact with the heating surface of the heating element prior to the beginning of the melting process.

It is expedient for the relatively movable delimiting element—i.e. the contact element together with the molded part—to be moved out of the working position back in the direction of the resting position during the melting off of the at least one profile part, in other words, when its welding area is melting off, until the end of the melting process along the melt path, so that the melt path is equalized by the relatively movable delimiting element—i.e. the contact element together with the molded part—whereby the relatively movable delimiting element, at, least with its molded part, remains in contact with the heating surface of the heating element. The melt material is prevented from moving in the direction of the external exposed surface of the at least one profile part by the presence of the relatively movable delimiting element—i.e. the contact, element together with the molded part.

The one profile part is moved with its partially melted welding area in the direction of the other profile part, or else, both profile parts are moved towards each other in the joining direction.

Each profile support advantageously has at least one relatively movable delimiting element—i.e. the appertaining contact element together with the molded part. It is advantageous if, at the beginning of the compression process, the appertaining relatively movable delimiting element—i.e. the contact element together with the molded part—initially remains in the appertaining working position so as to form the appertaining holding plane, whereby delimiting elements situated opposite from each other—i.e. their appertaining molded parts—adjoin each other at their appertaining free front faces or contact surfaces. As the converging movement of the profile parts to be joined progresses, the holding plane is reduced in size. Once the welding areas of the profile parts to be joined rest against each other, the holding plane has a value of ZERO, whereby the appertaining free front faces or contact surfaces of the appertaining molded parts remain in contact. As the compression increases, the appertaining relatively movable delimiting elements—i.e. the appertaining contact element together with the molded part—are moved along the compression path, whereby the appertaining free front faces or contact surfaces of the appertaining molded parts remain in contact with each other, at least until the compression has been completed. The melt material is prevented from moving in the direction of the external exposed surface of the at least one profile part by the presence of the relatively movable delimiting element—i.e. the contact element together with the molded part—also during the compression. Since the relatively movable delimiting element—i.e. the contact element with its surface—rests against the profile surface, also during the compression, the appertaining melt material surface is advantageously kept at the same level as the profile surface, also during the compression.

As set forth in the invention, it is advantageous if the appertaining profile, part is additionally profiled in the associated welding area during or preferably after the compression. This makes it possible to do without the secondary finishing work in order to create a groove. In a preferred embodiment, the contact element and the molded part are each mounted on a sliding surface so as to be movable relative to each other. The sliding surface can preferably be configured so as to be inclined, and further preferably, it is inclined at an angle of 45° relative to the profile surface.

In this manner, the contact element can be moved together with the molded part during the set-up, the melting, the melting-off process, the end of the melting process and the changeover from melting to compression.

During the changeover from melting to compression, however, the molded part can also be moved relative to the contact element into its working position, whereby the molded part, together with a partial section of the appertaining sliding surface, then forms the holding plane. This holding plane would then be inclined to match the inclination of the sliding surface, and would extend beyond the free front edge of the appertaining profile part in a slanted orientation. The slanted holding plane entails the advantage of another function, namely, it can prevent dripping of the melt material. If the molded part is moved in such a way that the holding plane is created, the contact element can, of course, be moved back.

However, it is also possible for the molded part to be moved only at the time of the compression itself, in other words, preferably at the end of the compression process, along the sliding surface of the contact element slanted in the direction of the working position of the molded part in such a way that the appertaining free front faces or contact surfaces, in other words, the profiled sections, which rest against each other, penetrate into the melt material and thus create, that is to say, emboss, the desired groove on the external exposed surfaces of the connected profile parts. The appertaining free front face of the molded part can be profiled to match the desired groove shape that is to be created. Therefore, the appertaining free front face can be configured so as to be, for instance, pointed or else flat, although the possible configurations are not limited to these.

Since the profile part can have, for example, a polygonal—in other words, e.g. a square or rectangular—basic shape, it is advantageous as set forth in the invention for each surface of the appertaining profile part to be associated with a correspondingly adapted relatively movable delimiting element—i.e. the contact element together with the molded part. Moreover, the corresponding number of relatively movable delimiting elements can be associated with each corner that is to be created, for instance, for the window frame or door frame if, for example, a four-head welding machine is provided. Hence, each profile support also has a relatively movable delimiting element—i.e. the contact element together with the molded part—whereby each surface of the appertaining profile part has a profile support, or else a profile support section of the profile support with which several surfaces can also be associated.

Continuously adjustable movement elements can be provided in order to move the relatively movable delimiting element—i.e. the appertaining contact elements and/or the molded parts. Electric, electromechanical, mechanical, hydraulic, electro-hydraulic, pneumatic or electro-pneumatic drives are likewise conceivable. For purposes of controlling the movement paths of the appertaining relatively movable delimiting element, the drives can communicate with the central control unit that is already on hand for the device, in other words, the control unit of the welding machine. Of course, it is also possible to provide a separate control unit for the appertaining delimiting element.

The device according to the invention is characterized by a delimiting element that comprises a contact element and a molded part which are relatively movable towards each other as well as towards the profile part, whereby, at least during the melting off of the at least one profile part, the movable contact element—together with the molded part—can be moved relative to the at least one profile part and to the heating element out of a resting position in the direction of a working position, whereby, at least during the melting off, at, least the molded part is in contact with the heating surface of the heating element, and the contact element is in contact with a profile surface.

In an advantageous embodiment, the relatively movable delimiting element—i.e. the contact element together with the molded part—is preferably accommodated in a receptacle that is arranged on the device, that is to say, on the profile support. The receptacle is open in the direction of the front face of the device, that is to say, of the profile support, and it has a stop wall opposite thereto. A base leg extends from the stop wall towards the front face. The base leg is preferably configured in such a way that its front face is flush with a front face of the relatively movable delimiting element after the set-up and/or before the beginning of the melting process. The delimiting element, in turn, is dimensioned in such a way that the surface of the contact element that is oriented towards the profile part rests against the profile surface, and the surface of the molded part situated opposite thereto rests against the base leg surface. Thus, the delimiting element is relatively movable, so to speak, between the profile part and the base leg, and it is preferably mounted on the appertaining surfaces without leaving any gap.

The delimiting element—i.e. the molded part—advantageously has a projection so that the delimiting element—i.e. the contact element together with the molded part—is held so as to rest against the receptacle, in other words, on the base leg. Advantageously, the relatively movable delimiting element—i.e. the contact element together with the molded part—can rest against the profile stop during the set-up. It is a favorable aspect if the delimiting element—i.e. the contact element together with the molded part—also rests against the heating surface of the heating element already prior to the melting-off process, in other words, before the beginning of the melting process.

It is expedient if the relatively movable delimiting element—i.e. the contact element together with the molded part—can be moved out of the working position back in the direction of the resting position during the melting off of the at least one profile part, until the end of the melting process, along the melt path, so that the melt path can be equalized by the relatively movable delimiting element, whereby the relatively movable delimiting element—i.e. the molded part—remains in contact with the heating surface of the heating element. The melt material is prevented from moving in the direction of, the external exposed surface of the at least one profile part by the presence of the relatively movable delimiting element—i.e. the contact element together with the molded part.

The heating element is removed once the melting-off process has been completed. In order to prevent the melt material from flowing in the direction of the external exposed surface of the at least one profile part, it is advantageously provided that, when the changeover is made from melting to compression, the relatively movable delimiting element—i.e. the contact element together with the molded part—can be moved horizontally in the direction of its working position in such a way that the relatively movable delimiting element—i.e. the contact element together with the molded part—extends beyond a free front edge of the at least one profile part, so that a holding plane is created for the melt material. Since the relatively movable delimiting element—i.e. the contact element with its surface—rests against the profile surface, the appertaining surface of the melt material is advantageously held at the same level as the profile surface.

Each profile support, that is to say, each profile part, advantageously has at least one relatively movable delimiting element—i.e. the appertaining contact element together with the molded part. It is advantageous if, at the beginning of the compression process, the relatively movable delimiting element—i.e. the contact element together with the molded part—initially remains in the appertaining working position so as to form the appertaining holding plane, whereby delimiting elements situated opposite from each other—i.e. molded parts situated opposite from each other—rest against each other at their appertaining free front faces or contact surfaces. As the converging movement of the profile parts to be joined progresses, the holding plane is reduced in size. Once the welding areas of the profile parts to be joined rest against each other, the holding plane has a value of ZERO, whereby the appertaining free edges of the appertaining relatively movable delimiting elements—i.e. the molded parts—remain in, contact. As the compression increases, the appertaining relatively movable delimiting elements—i.e. the appertaining contact element together with the molded part—are moved along the compression path, whereby the appertaining free front faces or contact surfaces of the molded parts remain in contact with each other, at least until the compression has been completed. The melt material is prevented from moving in the direction of the external exposed surface of the at least one profile part by the presence of the relatively movable delimiting element, also during the compression. Since the relatively movable delimiting element—i.e. the contact element with its surface—rests against the profile surface, also during the compression, the appertaining melt material surface is advantageously kept at the same level as the profile surface, also during the compression.

It is advantageous if the appertaining profile part is additionally profiled in the associated welding area during the compression. This makes it possible to do without the secondary finishing work aimed at creating a groove. The contact element and the molded part can each be mounted on a sliding surface, so as to be movable relative to each other. The sliding surface can preferably be configured so as to be inclined, and further preferably, it is inclined at an angle of 45° relative to the profile surface. In this manner, the contact element can be moved together with the molded part during the set-up, the melting, the melting-off process, the end of the melting process and the changeover from melting to compression. During the changeover from melting to compression, however, the contact part can be moved back into its resting position, whereby the molded part is then moved relative to the contact element into its working position, and a free edge or the molded part now forms the holding plane.

However, it is also possible for the molded part to be moved only at the time of the compression itself, in other words, preferably at the end of the compression process, along the sliding surface of the contact element at a slant in the direction of the working position of the molded part in such a way that the appertaining profiled sections, which rest against each other, penetrate into the melt material and thus create the desired groove on the external exposed surfaces of the connected profile parts. The appertaining front face of the molded part, can be profiled to match the desired groove shape that is to be created. Therefore, the appertaining front face can be configured so as to be, for instance, pointed or else flat, although the possible configurations are not limited to these. The two melded parts, which rest against each other, virtually form a correspondingly configured stamp with their appertaining projection having the appropriate profiling.

Since the profile part can have, for example, a polygonal—in other words, e.g. a square or rectangular—basic shape, it is advantageous as set forth in the invention for each surface—in other words, each external exposed surface—to be associated with a correspondingly adapted relatively movable delimiting element. Moreover, the corresponding number of relatively movable delimiting elements can be associated with each corner that is to be created, for instance, for the window frame or door frame if, for example, a four-station or four-head welding machine is provided.

Additional objectives, advantages, features and application possibilities of the present invention ensue from the description below of an embodiment with reference to the drawings, whereby identical elements or elements with equivalent functions, are for the most part provided with the same reference numerals. In this context, all of the described and/or depicted features, either on their own or in any meaningful combination, constitute the subject matter of the present invention, also irrespective of their compilation in the claims or the claims to which they refer back.

DESCRIPTION OF THE DRAWINGS

The following is shown here:

FIGS. 2 to 6 schematic diagrams of consecutive steps for connecting the two plastic profile parts shown in FIG. 1, with the device shown in FIG. 1.

DETAILED DESCRIPTION

Figure 1:
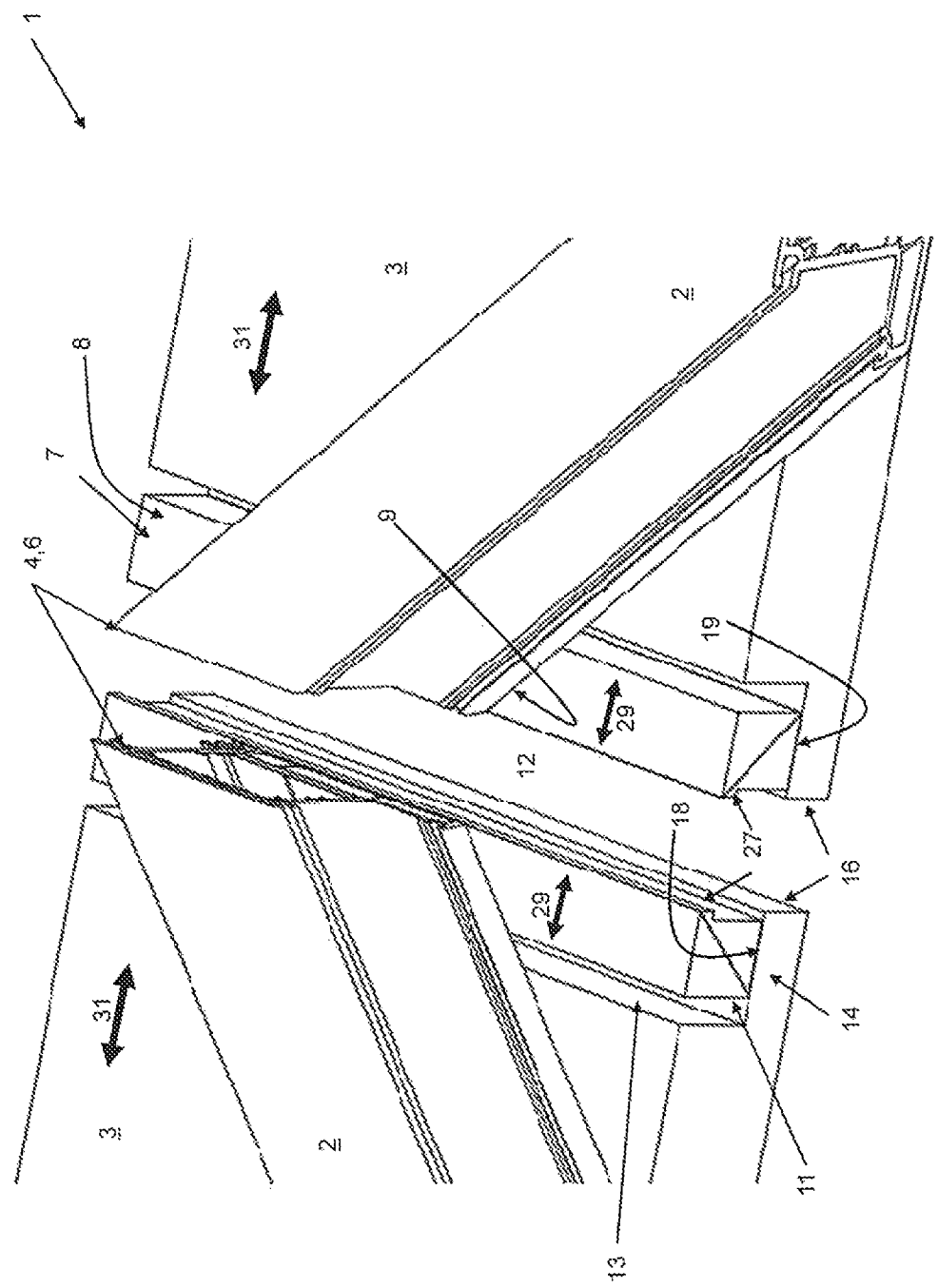
FIG. 1 a partial sectional view of a device for connecting two plastic profile parts, for example, in a parallel-feed method.

FIG. 1 shows a device 1 for connecting two plastic profile parts 2, which hereinafter are referred to as profile parts 2 and which are made, for instance, of PVC. The device 1 has profile supports 3, a welding bench (not shown here) and clamping jaws (not visible here) as well as additional familiar partial devices. Each profile support 3 supports a profile part 2, whereby a profile support 3 or a profile support section is associated with each surface of the profile part 2 so that the profile part 2, as seen in the circumferential direction, is completely mounted and held in place over the entire circumference. The figures show only one profile support 3, both in the right-hand and in the left-hand drawing plane. Each of the free front edges 4 of each of the profile parts 2 have mitered cuts 6 which correspond to each other. The device 1 serves to produce, for example, window frames or door frames.

The device 1 has at least one delimiting element 7 that can be moved relative to the appertaining profile part 2. The surface 8 of the movable delimiting element 7 rests against the associated profile surface 9. FIG. 1 shows the delimiting element 7 in a resting position by way of an example. The delimiting element 7 depicted in FIG. 1 is configured in two parts and it has a cube-shaped configuration in the embodiment selected here.

The relatively movable delimiting element 7 is accommodated in a receptacle 11 that is arranged on the device 1, in other words, on the profile support 3, as can be seen in FIG. 1. The receptacle 11 is open towards a front face 12 of the profile support 3 and it has a stop wall 13 situated opposite thereto. A base leg 14 extends from the stop wall 13 in the direction of the front face 12. The base leg 14 is preferably configured in such a way that, after the set-up (FIG. 2) and/or before the beginning of the melting process (FIG. 3), its front face 16 is flush with a front face 17 of the relatively movable delimiting element 7. The dimensions of the delimiting element 7, in turn, are configured such that its surface 8, which is oriented towards the profile part 2, rests against the profile surface 9 while its surface 18, which is oriented opposite thereto, rests against the base leg surface 19. Consequently, the delimiting element 7 is relatively movable between the profile part 2 and the base leg 14 and it is mounted on the appertaining surfaces 9, 19, preferably without leaving any gap. For instance, the delimiting element 7 can be configured so as to be cube-shaped, plate-like or triangular, although the geometrical configurations are not limited to these.

In the resting position shown by way of an example, the front face 17 of the delimiting element 7 is at a distance from the front face 16 of the base leg 14. The delimiting element 7 is also at a distance from the stop wall 13. Of course, the delimiting element 7 can also rest against the stop wall 13 when it is in its resting position.

As can be seen in FIGS. 1 to 6, the delimiting element 7 is configured in two parts and it has a contact element 21 and a molded part 22, both of which can be moved relative to each other.

The contact element 21 has an essentially triangular structure, whereby its base surface 23 can be configured as the sliding surface for the molded part 22. The molded part 22 likewise has an essentially triangular structure, whereby its basic surface 24 can be configured as the counter-sliding surface to the base surface 23. As can be seen in FIG. 1, the corresponding surfaces 23 and 24 are arranged so as to run at a slant, in other words, preferably at an angle of 45° relative to the profile surface 9. Of course, this value for the angle is only given by way of an example and should by no means be construed as being of a limiting nature.

Moreover, the front face 17 of molded part 22 has a profiled section 26 (FIG. 5) corresponding to the front face of the delimiting element 7. For instance, this profiled section is pointed, whereby the front face 17 has a projection 27. This projection 27 ensures that the delimiting element 7 remains in contact with the base leg surface 19, as can be seen in each of FIGS. 2 to 4. In an advantageous manner, the projection 27, of course, is also arranged on the delimiting element 7, which is configured as a single part, as can be seen in FIG. 1. Naturally, the profiled section 26 can also be configured so as to be flattened, that is to say, virtually stamp-like. The configuration depends on the shape of the groove that is to be created. Corresponding contact surfaces 28 of the appertaining, molded parts 22 can be seen against which the appertaining molded parts 22 can rest without leaving any gap.

As can be seen in FIG. 1, the movable delimiting element 7 is mounted on the appertaining profile support 3 (double-headed arrow 31) in a horizontal direction (double-headed arrow 29 that is parallel to but independent of the movement of said profile support 3. Here, one can see the surface 8 that rests against the profile surface 9, whereby an adequate mounting on the base leg 14 opposite thereto is sufficient for this purpose, which is why the projection 27 is configured accordingly.

Figure 5:
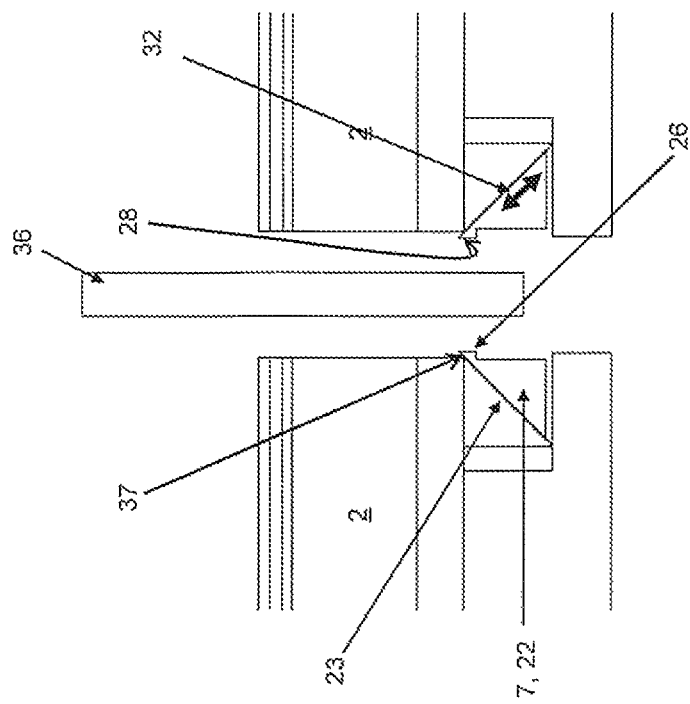

By way of an example, FIG. 1 shows a parallel-feed method for connecting profile parts 2, which can be recognized by the two double-headed arrows 31. The two elements of the delimiting element 7—i.e. the contact element 21 and the molded part 22—are relatively movable towards each other, which is indicated by means of the double-headed, arrow 32 (FIGS. 2, 5 and 6).

FIG. 2 shows the set-up of the device 1, whereby the two profile parts 2 are each brought into contact with a profile stop 33. As can be seen here, during the set-up, the relatively movable delimiting element 7 is moved horizontally into its working position and brought into contact with the profile stop 33. In this process, the front face 17 of the delimiting element 7, that is to say, its molded part 22, is flush with the front face 16 of the base leg 14. The contact surface 28 of the molded part 22 is flush with the appertaining front edge 4 of the appertaining profile part 2. The contact surface 28 of the molded part 22 is in contact with the profile stop 33.

Once the set-up has been completed, the heating element 34, which has a heating surface 36 on both sides, is put into use. At the beginning of the melting process (FIG. 3), both profile parts 2 are brought into contact with the heating surface 34 of the heating element 36. The relatively movable delimiting element 7—i.e. the contact element 21 together with the molded part 22—can be moved horizontally so as to be brought into contact with the heating surface 34 of the heating element 36 before the beginning of the melting process. In this context, the front face 17 of the delimiting element 7—i.e. its molded part 22—is flush with the front face 16 of the base leg 14. The contact surface 28 of the molded part 22 is flush with the appertaining front edge 4 of the appertaining profile part 2. The contact surface 28 of the molded part 22 rests against the heating surface 34.

The melting-off process can begin. During the melting-off process, the front edges 4 of the two profile parts start to melt. During this partial melting, the contact surfaces 28 of the molded part 22 that rest against the heating surface 34 remain, in contact with the appertaining heating surface 34. In this process, the profile parts 2 are each pressed against the heating surface 34. This melt path is equalized by the movable delimiting element 7 in that the latter is moved in the direction of the stop wall 13.

In the invention, the movable delimiting element 7—i.e. the contact element 21 together with the molded part 22—is movable relative to the appertaining profile part 2 and relative to the heating element 36, also during the partial melting.

Figure 4:
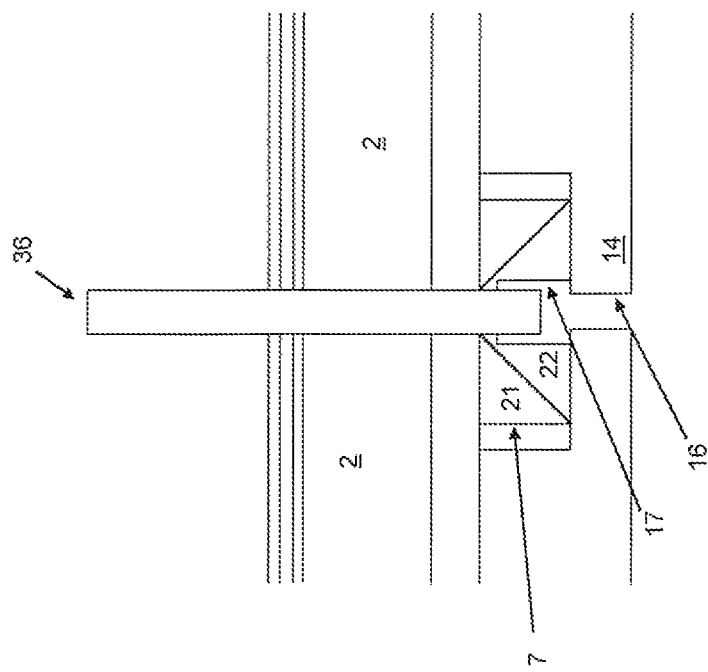

FIG. 4 shows the state of the end of the melting process at which time the profile parts 2 have been sufficiently melted. In this context, the delimiting elements 7—i.e. the contact element 21 together with the molded part 22—were moved out of the working position back towards the stop well 13 along the melt path. However, during the partial melting and until the end of the melting process, the contact surfaces 28 of the molded parts 22 always remained in contact with the appertaining heating surface 34, which can also be seen in the end of the melting process shown in FIG. 4. The front face 17, however, is at a distance from the front face 16 of the base leg 14.

This makes it possible to advantageously regulate the flow of the melt material during the partial melting, that is to say, in the direction of the profile surface 9, which constitutes an external exposed surface.

After the partial melting process, a changeover is made to compression. In this process, there is a risk that the melt material might flow towards the profile surface 9, that is to say, towards the outside. Such a flow is prevented according to the invention in that the molded part 22 is moved in the direction of the working position so that its base surface 23 extends beyond the partially melted free front edge 4 of the appertaining profile part 2, in other words, the welding area, in such a way that a holding plane 37 is formed, as depicted in FIG. 5. In this position, the surface 18 of the molded part 22 is at a distance from the base leg surface 19, in other words, it is virtually raised.

FIG. 5 shows the changeover from melting to compression, whereas the heating element is still situated between the partially melted profile parts 22.

In the embodiment shown in FIG. 5, the molded part 22 has been moved relative to the contact element 21 along the corresponding base surface 23 in the drawing plane upwards at a slant in such a way that an inclined holding plane 37 is formed. However, it is likewise possible for the contact element 21 to be moved together with the molded part 22 in the direction of the working position so that the surface 8 of the contact element 22, i.e. the delimiting element 7, forms the holding plane 37 that would then be at the same level as the profile surface 9.

Both approaches allow a regulation of the melt material, whereby the inclined holding plane 37 can also provide protection against dripping.

The changeover procedure is followed by compression, as depicted in FIG. 6. Here, both profile parts 2 are moved with their partially melted front edges 4 towards each other, in other words, they are pressed against each other. It can be seen that the delimiting elements 7 according to the invention execute this movement accordingly. In this process, the contact surfaces 28 of the molded parts 22 are brought into contact with each other as the movement of the profile parts 22 progresses, whereby the contact surfaces 28, which are resting against each other, remain in contact until the end of the compression process, so that the flow of the melt material is regulated.

It is possible to move the molded parts 22 along the compression path in such a way that the melt material is level at first, that is to say, at the same level, as the profile surface 9. The return movement of the molded part 22 brings about a corresponding movement of the contact element 21.

The two profile parts 2 are preferably moved towards each other to such an extent, in other words, they are compressed, until the front faces 16 of the base legs 14 are resting against each other. The front faces 17 of the appertaining delimiting element 7, i.e. also of the molded part 22, are offset into the interior of the receptacle 11 with respect to the front face 16. The contact surfaces 28 are likewise in contact with each other.

Once the compression process has been completed, the molded part 22 can be moved again along the base surface 23 towards the melt material (FIG. 6, double-headed arrow 32), so that the profiled sections 26 of the molded parts 22, which rest against each other, create an appertaining groove in the melt material. This state can be seen in FIG. 6, where the molded part 22, whose surface 18 is oriented towards the base leg surface 19, is slighted raised.

The invention dispenses with the secondary finishing that has been necessary until now and that has been aimed at removing the weld bead that had actually formed on the profile surface 9, since such a weld bead is advantageously avoided by the invention. Moreover, simultaneously with the creation of the profile connection, a groove is embossed into the melt material, so that also in this respect, it is possible to dispense with secondary finishing work—if not altogether, then at least to a considerable extent. Any burrs that might still be present can then be removed. The savings in terms of the cycle times in the production of the door frames or window frames are also quite considerable.

LIST OF REFERENCE NUMERALS 1 device for connecting plastic profiles
2 plastic profile part
3 profile support
4 front edge of 4
5
6 mitered cut
7 delimiting element
8 surface of 7
9 profile surface of 2
10
11 receptacle
12 front face of 3
13 stop wall
14 base leg of 11
15
16 front face of 14
16 front face of 7
18 surface of 7
19 base leg surface
20
21 contact element
22 molded part
23 base surface of 21
24 basic surface of 22
25
26 profiled section of 22
27 projection
28 contact surface of 22
29 double-headed arrow
30
31 double-headed arrow
32 double-headed arrow
33 profile stop
34 heating surface
35
36 heating element
37 holding plane

The invention claimed is:

1. A method for connecting a first plastic profile part (2) to a second plastic profile part (2), comprising:
   bringing into contact a front edge of the first profile part (2) and a heating surface (34) of a heating element (36) in a joining direction in order to start to melt the first profile part (2) in its welding area before it is joined to the second profile part (2),
   moving, from a resting position to a working position relative to the first profile part (2) and relative to the heating element (36), a delimiting element (7), said delimiting element (7) comprising at least one contact element (21) and a molded part (22), both of which are movable relative to each other and movable relative to the first profile part (2), keeping at least a profiled section (26) of the molded part (22) in contact with the heating surface (34) of the heating element (36) and keeping the contact element (21) in contact with a profile surface (9) of the first profile part (2) as the welding area of the first profile part (2) is melted; and
   before the first profile part (2) is compressed for joining to the second profile part, moving the contact element (21)—together with the molded part (22)—of the delimiting element (7) in the direction of its working position so that the profiled section (26) of the delimiting element (7) extends beyond the front edge (4) of the first profile part (2) to create a holding plane (37).

2. The method according to claim 1, wherein the contact element (21)—together with the molded part (22)—is moved at least in a direction parallel to the profile surface (9) of the first profile part (2).

3. The method according to claim 1, wherein the first profile part (2) is brought into contact with a profile stop (33) and wherein the contact element (21)—together with the molded part (22)—is moved horizontally into its working position and is brought into contact with the profile stop (33).

4. The method according to claim 1, wherein the first profile part (2) is brought into contact with the heating surface (34) of the heating element (36) before melting begins, and wherein contact element (21)—together with the molded part (22)—is moved horizontally into its working position and the molded part (22) is brought into contact with the heating surface (34).

5. The method according to claim 1, wherein the contact element (21)—together with the molded part (22)—is moved along a melt path out of the working position back in the direction of the resting position during the melting of the at first profile part (2), and the molded part (22) of the delimiting element (7) remains in contact with the heating surface (34) of the heating element (36).

6. The method according to claim 1, wherein at the beginning of the compression process, the relatively movable contact element (21)—together with the molded part (22)—initially remains in the working position as the first and second profile parts (2) are compressed together along a compression path, and is then moved back in the direction of the resting position.

7. The method according to claim 1, wherein the welding area is profiled by the contact element (21) after being connected to the other second profile part (2) as the molded part (22) of the delimiting element (7) is moved relative to the contact element (21).

8. The method according to claim 1, wherein the delimiting element (7)—with its contact element (21) together with the molded part (22)—is accommodated for relative movement in a receptacle (11) of a profile support (3).

9. A device for connecting first and second profile parts (2), comprising:
a delimiting element (7) with which the flow and deformation of melt material of a welding area of the first profile part (2) to be joined to the second profile part (2) can be regulated, said delimiting element (7) being accommodated for relative movement in a receptacle (11) of a profile support (3) for the first profile part, the delimiting element (7) comprising a contact element (21) and a molded part (22), both of which are movable relative to one other as well as movable relative to the first profile part (2), so that before the welding area at a front edge (4) of the first profile part (2) is compressed to the second profile part (2), the contact element (21)—together with the molded part (22)—of the delimiting element (7) is movable in the direction of its working position so that a profiled section (26) of the molded part (22) of the delimiting element (7) extends beyond the front edge (4) of the first profile part (2) to create a holding plane (37).

10. The device according to claim 9, wherein the receptacle (11) is open in the direction of a front face, and has a stop wall (13) opposite thereto, and wherein a base leg (14) extends from the stop wall (13) towards the front face (16), and the contact element (21) has a surface (8) in contact with a profile surface (9) of the first profile part (2) and the molded part (22) has an opposite surface (18) that rests against a base leg surface (19).

11. The device according to claim 9, wherein the profiled section (26) of the molded part (22) is a projection (27) on its front face (17).

12. The device according to claim 9, wherein the molded part (22) is slidably movable relative to the contact element (21) while a face of the molded part (22) remains in contact with a base surface (23) of the contact element (21).

13. The device according to claim 10, wherein the molded part (22) in its working position is spaced apart from the base leg surface (19).

14. The device according to claim 9, further comprising a second delimiting element that comprises a second contact element and a second molded part, and wherein the molded part (22) of the delimiting element (7) is brought into contact with the second molded part of the second delimiting element as the front edge (4) of the first profile part (2) is brought into contact with the second profile part.

* * * * *